United States Patent [19]

Schumacher

[11] Patent Number: 4,831,228

[45] Date of Patent: May 16, 1989

[54] ELECTRICAL RESISTANCE WELDING GUNS HAVING WORKPIECE CLAMPING AND INDEPENDENT ELECTRODE BIASING

[75] Inventor: Berthold W. Schumacher, Dearborn, Mich.

[73] Assignee: Ford Motor Company, Dearborn, Mich.

[21] Appl. No.: 104,003

[22] Filed: Oct. 2, 1987

[51] Int. Cl.$^4$ ............................................. B23K 9/10
[52] U.S. Cl. ............................. 219/86.22; 219/86.51
[58] Field of Search ............. 219/80.22, 80, 84, 85 G, 219/86.1, 86.51, 87, 86.7, 83, 86.24, 86.25

[56] References Cited

U.S. PATENT DOCUMENTS 4,419,558  12/1983  Stiebel .................................. 219/109

FOREIGN PATENT DOCUMENTS 48510  10/1985  U.S.S.R. ............................ 219/86.23

OTHER PUBLICATIONS

SAE Technical Paper Series Monitoring and Control of Spot Weld Operations, Stiebel, Ulmer, Kalrach and Holmes 2/24–28/86.

*Primary Examiner*—E. A. Goldberg
*Assistant Examiner*—L. Donovan
*Attorney, Agent, or Firm*—Frank G. McKenzie; Donald J. Harrington

[57] ABSTRACT

An electrical resistance welding gun includes a hydraulically or pneumatically actuated clamping device for forcing workpieces into contact with one another, and a device for preloading and maintaining loaded contact between welding electrodes located on opposite sides of the workpieces. The electrodes are preloaded by a compression spring whose force is entirely independent of the action of the hydraulically-catuated clamping device. The electrode is supplied with electrical welding power and is cooled by circulating coolant through the electrode. A piezo-electric sensor provides an indication of the electrode biasing force and of changes in this force during welding. The force signal from the sensor may be used for feedback control of weld current and length of the period during which weld current is applied. The initial electrode force is easily adjustable by changing the effective length of the spring.

16 Claims, 3 Drawing Sheets

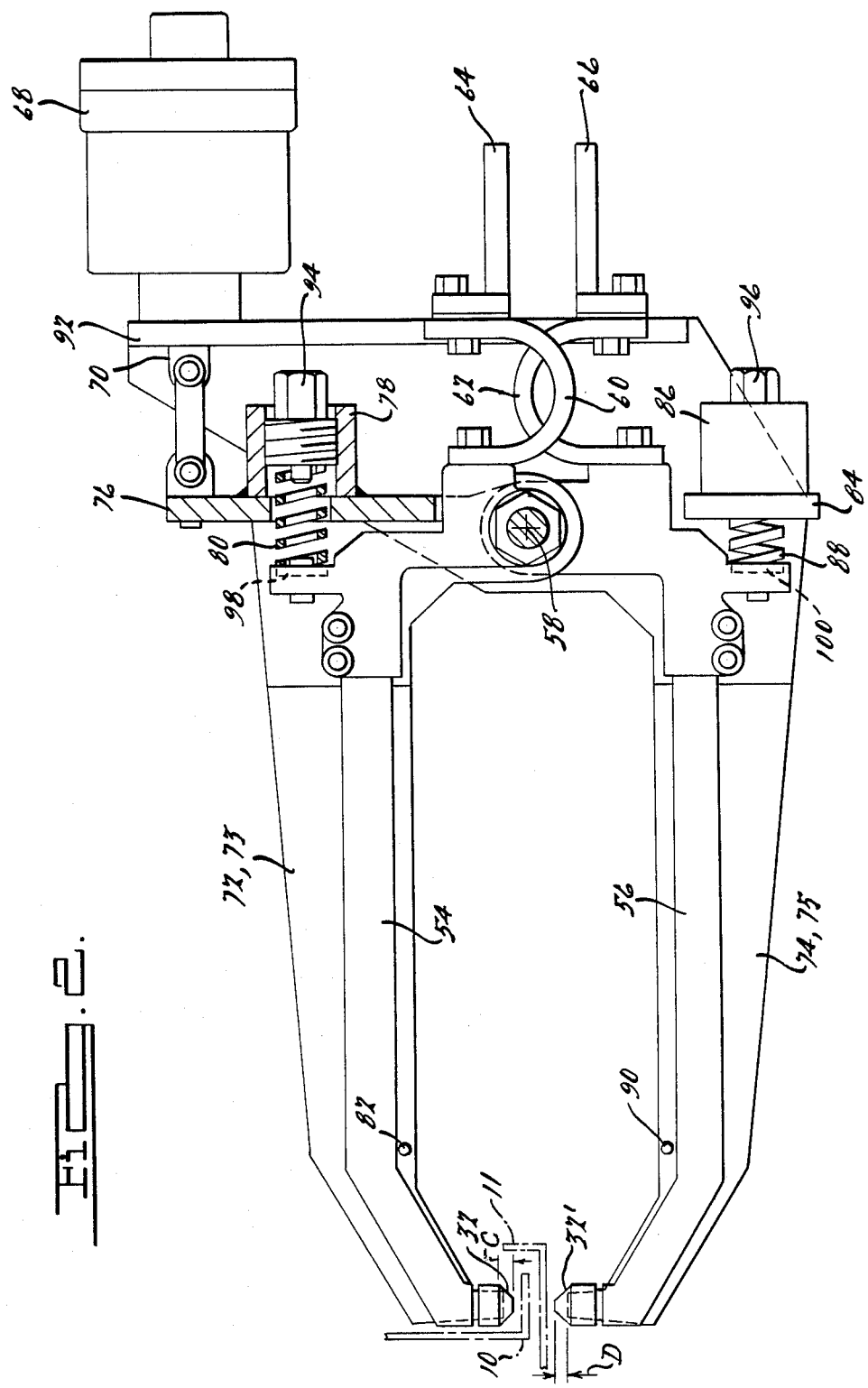

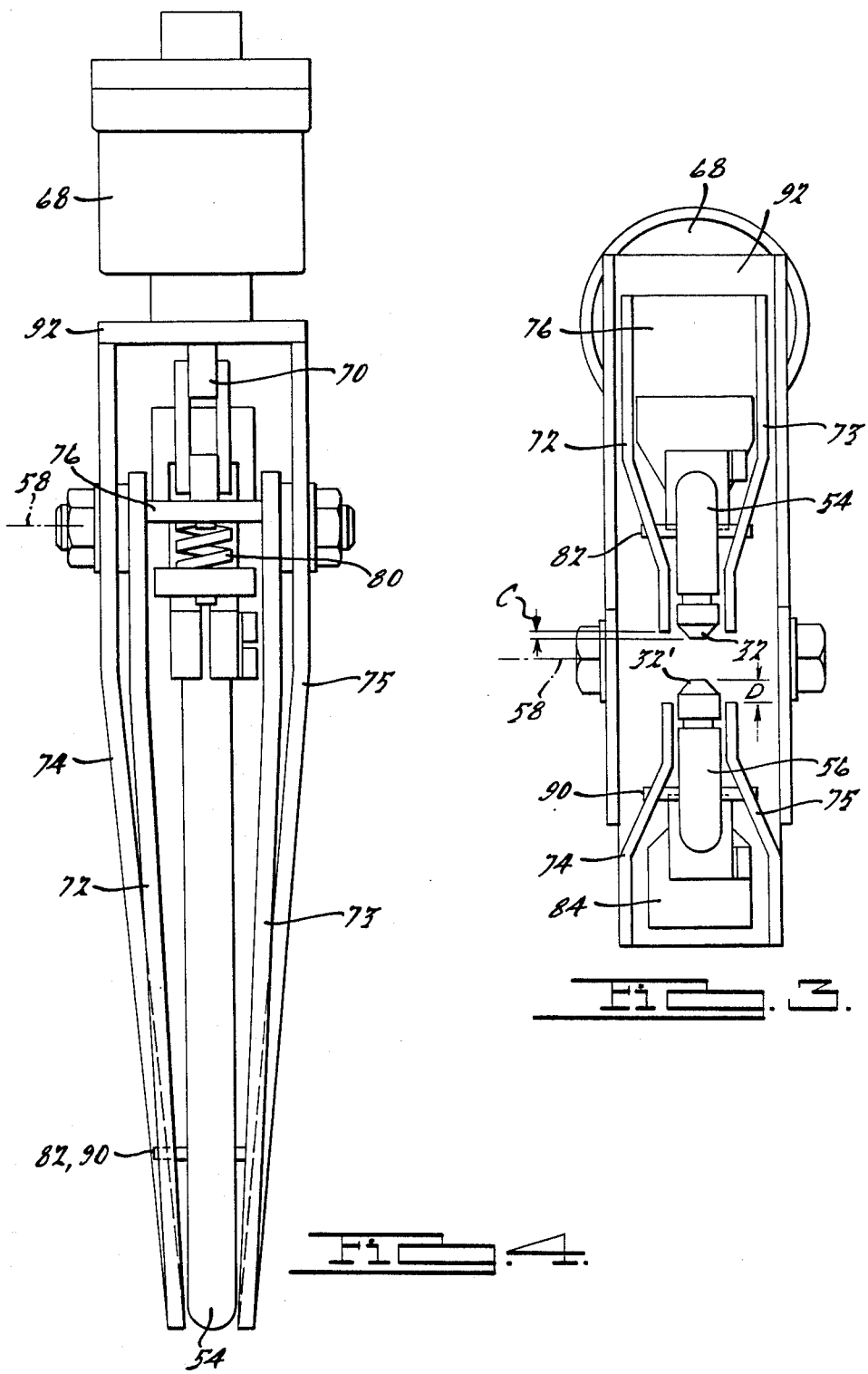

ELECTRICAL RESISTANCE WELDING GUNS HAVING WORKPIECE CLAMPING AND INDEPENDENT ELECTRODE BIASING

BACKGROUND OF THE INVENTION

1. Field of the Invention

This invention relates to the art of making electrical resistance spot welds in metal workpieces. More particularly, the invention pertains to the field of welding guns, capable of forcing the workpieces into mutual contact, holding them in position during welding, and forcing a welding electrode into contact with the workpieces.

2. Description of the Prior Art

The quality of an electrical resistance spot weld is adversely affected by poor fit of the workpieces to be welded if they are spaced from one another during welding rather than being in metal-to-metal contact. The spot welding gun used to make the weld must first pull the parts together into contact. But the force at the interface between the workpieces is less than the applied force because the workpieces themselves, due to their structural stiffness react the applied force and carry it from the welding zone. When the parts are particularly stiff and the space between them is sufficiently large, the clamping force applied by the welding gun can be so low at the welding zone that premature metal ejection and a weak weld will result. This condition is particularly serious where high strength steels are welded since these materials have a large stiffness modulus. Consequently, greater forces are required to produce the necessary deflection to bring the workpieces into contact at the welding gun. The loss of force at the welding zone is particularly deleterious in the case of coated or galvanized steels because ejection of metal between the sheets will occur.

When conventional force sensors are installed in standard welding guns, they expand and contract with thermal changes in the workpiece metal in the weld zone. Such sensors have been used to monitor the welding process and are described in U.S. Pat. No. 4,419,558 of Ariel Stiebel and in SAE Technical Paper 860579, February 1986. The device described in that patent does not use the workpiece surface itself as a reference surface. The device is therefore affected by changes in the thickness of the workpiece due to thermal effects and by the lack of metal-to-metal contact between the workpieces.

SUMMARY OF THE INVENTION

In the welding gun according to this invention, clamping bars come to rest on the surfaces of the workpiece and act as reference points for the welding force. Here, changes in the thickness of the workpiece due to thermal effects can be measured during welding regardless of the thickness of the workpiece and regardless of the quality of the fit among the workpieces. The dual force welding gun of this invention is ideally suited to monitor the welding process so that suitable adjustments can be made that contribute to greater quality and reliability. These adjustments can be adapted to continual changes in a high speed manufacturing process in which thousands of resistance spot welds are made to produce each component fabricated in the assembly process.

The welding gun of this invention (i) forces the workpieces into good metal contact and (ii) forces the welding electrodes to confine the molten metal produced during welding. These functions are performed by two separate and independent force application systems, which are integral parts of the same welding gun. The two forces can be set and adjusted separately and the force between the electrodes and the workpieces is not affected in any way by the quality of the fit among the workpieces. It is never necessary to apply excessive force to the welding electrodes; a light force only is required to maintain electrode contact with the workpieces. The length of the useful period between "electrode dressing" cycles is increased, thereby reducing the overall cost of the welding operation.

In one of the embodiments of this invention, it is possible to measure and display the constant welding force at the electrode during welding. In another version of the design, the welding force on the electrodes can be changed on command, for example, so that the welding gun can be first used to join thin material and later to join thick material. A sensor may be added to monitor dilation produced during welding, the sensor thereby providing a means for closing a feedback loop to change the magnitude of welding current during the weld process or the length of time the welding current is applied to the electrodes. Any kind of dilation measuring device can be used acting between the clamping plate and the electrode arms. The device, located according to this invention, is insensitive to variations in sheet metal thickness and other common differences among the structural and material properties of the workpieces, because the workpiece surface itself, held fixed by the clamping plate, acts as a reference surface.

BRIEF DESCRIPTION OF THE DRAWINGS

FIG. 2 is a side view of a scissors spot weld gun according to this invention, of the type suitable for use by welding robots.

FIG. 3 is a front view of the scissors welding gun of FIG. 2.

FIG. 4 is a front view of the scissors spot weld gun of FIG. 2.

DESCRIPTION OF THE PREFERRED EMBODIMENT

Figure 1:
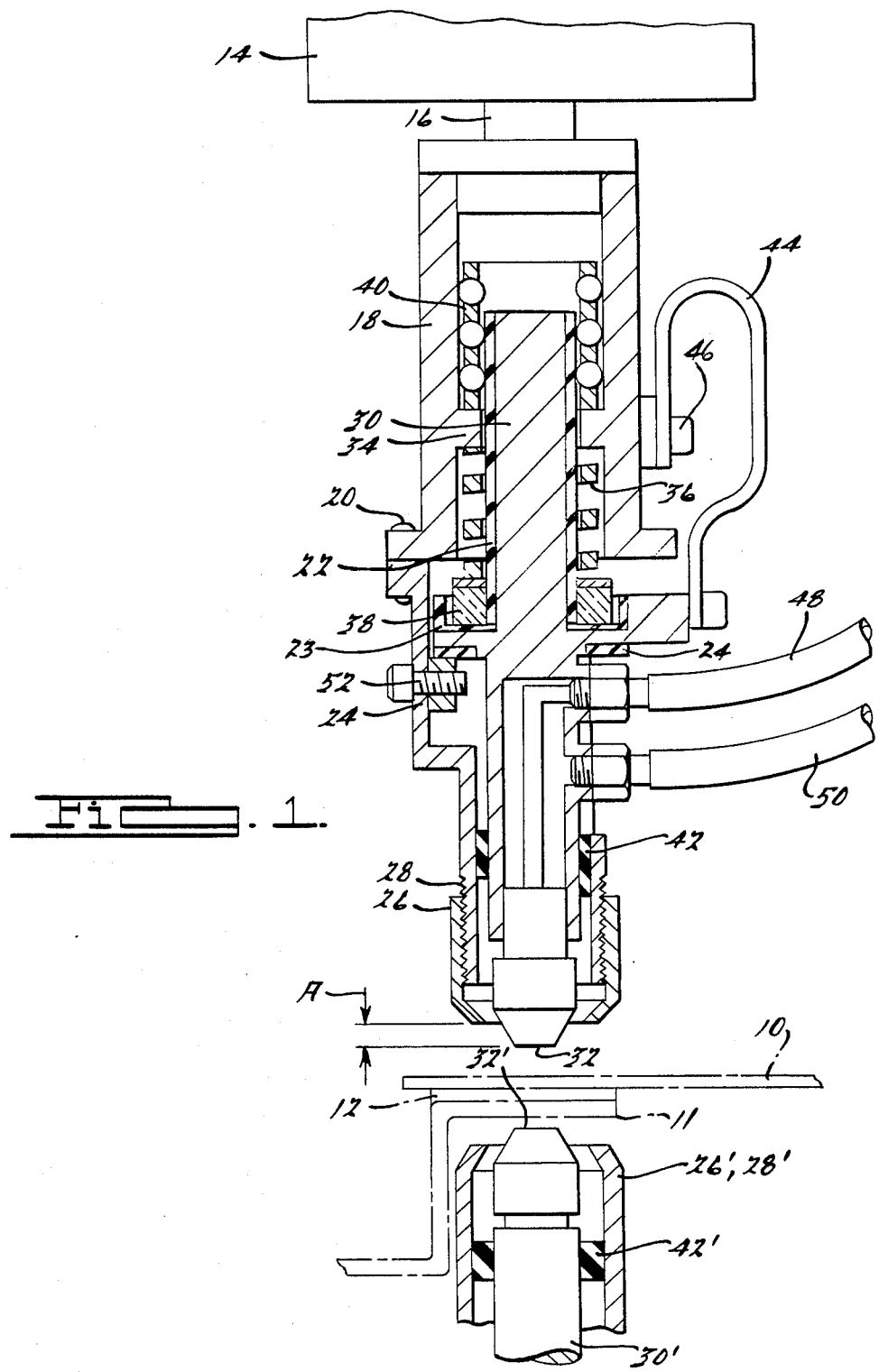
FIG. 1 is a cross section through the central plane of a welding gun according to this invention adapted to spot weld workpieces spaced from one another before the welding occurs.

Referring first to FIG. 1, a spot welding gun that applies a first force for clamping workpieces 10, 11 and a second force that maintains electrodes in contact with the workpieces is located above the workpieces. A second such welding gun is shown in a partial cross section located below the workpieces. The workpieces are shown separated from each other by a gap 12, which is removed by the application of the clamping forces developed by the welding guns.

Each welding gun is adapted for connection to an actuator 14, which may be a hydraulic or pneumatic cylinder having a piston movable within the cylinder in accordance with the direction of application and magnitude of hydraulic pressure applied to a double acting piston 16. The force of the piston is applied to the end of a first cylindrical tube 18, which is connected by a mechanical attachment 20 to a lower cylinder 24. A clamping ring 26, coaxial with cylinders 18 and 24, engages screw threads 28 formed at the lower end of cylinder 24 so that the axial position of ring 26 can be adjusted.

Located within cylinders 18, 24 and ring 26 is an electrode assembly that carries electrode surfaces 32 located at the end of electrode carrier 30. These surfaces are brought into contact with the workpieces while the welding is performed. The electrode carrier 30 is electrically insulated by insulating sleeve 22 and insulating flanges 23, 24. Tube 18 includes an interior flange 34 that reacts the force developed in a compression spring 36, fitted between the flange and at piezo-electric quartz ring 38, which measures the force produced by the spring and applied to the welding electrode carrier 30. A force developed within the spring can be read from suitable electronic equipment that converts the output from the piezo-electric ring to an electric signal that indicates the magnitude of the spring force. Ring 38 is seated within the recess formed on the electrode carrier 30. Movement of the electrode assembly within cylinders 18 is facilitated by supporting an end of the electrode on a linear ball bushing 40 and supporting the opposite end of the electrode in an electrical insulating sleeve 42, whereby the electrode is maintained coaxial with cylinders 18 and 28 throughout its range of motion. Electrical current is supplied to the movable electrode holder by way of flexible copper bands 44. The electric welding current is supplied through the connection 46.

Cooling water is supplied to and returned from the welding gun through hoses 48, 50 in the usual manner. To gain access, an electrode holder cutout is made in tube 24. Also located on the interior wall of tube 24 is a stop 52, which prevents the electrode holder from falling through the cylinders and prevents the spring from extending beyond the point where the stop contacts flange on electrode holder 30. The position of the stop is adjustable and is used to determine dimension A, the distance that the electrode tip extends beyond the end of tube 26.

When the hydraulic cylinder is activated, it moves clamping rings 26, 26' against opposite faces of the workpieces 10, 12. If sufficient force is supplied by the hydraulic actuator, the workpieces are forced into mutual contact even at a cross section such as that illustrated in FIG. 1, where the workpieces would not contact one another due to tolerance accumulation, distortion or prior attachment to other structures.

As the clamping rings are brought into contact with the workpieces, the electrode tips 32, 32' are forced back into the respective tubes in which they are located against the force of the associated springs, which maintain contact of the electrode tips on the workpieces. The force with which the electrodes rest on the workpieces is determined by the spring constant and the magnitude of dimension A. Typically, the spring force applied to the electrodes when welding is 6500 N. However, the clamping force developed by the hydraulic actuator and applied by the clamping ring to the working piece 10 can be established without respect to the force on the electrodes and regardless of the amount of displacement of the electrodes that occurs while the clamping force is being applied.

Referring next to FIGS. 2-4, a scissors welding gun according to the principles of this invention transmits the clamping force from a hydraulic acutator along clamping arms to the workpieces 10, 11. The electrodes 32, 32' are supported at the end of copper support arms 54, 56, which are pivoted about a common axis 58. Welding current is supplied though flexible copper strips 60, 62, which are connected to terminals 64, 66, respectively. Arms 54, 56 are not activated through operation of hydraulic cylinder 68 and piston 70 that moves within the cylinder. Instead, clamping force plates 72, 74 are forced against the workpieces by the force developed by the hydraulic actuator. The clamping plates are pivoted about axis 58, on which they are mounted by suitable insulated bearings. A vertical plate 76 connects clamping plates 72, 73 and supports housing 78, within which is retained a compression spring 80 that develops a force between plate 76 and electrode arm 54. The spring forces pushes the electrode arm downward until it contacts pin 82, fitted securely to clamping plates 72, 73.

Vertical plate 84 is welded to clamping plates 74, 75 and supports housing 86, in which is located a second compression spring 88, which develops a force between plate 84 and electrode arm 56. The force of the spring operates to pivot arm 56 about axis 58, thereby bringing electrode 32' upward into contact with pin 90, which is securely fixed to either or both of the adjacent clamping plates 75, 75.

Vertical plate 92 is welded to clamping plates 74, 75 and supports hydraulic cylinder 68. When cylinder 68 is activated by hydraulic pressure, its piston 70 pushes plates 92 and 76 apart, thereby forcing clamping plates 72, 73, 74 and 75 to close and force the workpiece together. There is no limit to the amount of force that can be applied by the hydraulic actuator. A reasonable force is 12,000 N. When the clamping arms close, the electrode arms 54, 56 contact the workpieces and are pushed back between the associated clamping arm through the distances C and D, respectively. The forces produced on the electrode arm due to contact with the workpiece against the effect of springs 80, 88 is determined by the respective spring constants and the precompression of the springs, which may be changed independently by altering the position of set screws 94, 96. These screws engage threads on the inner surface of housings 78, 86, respectively. The precompression of the springs need not be the same. The distances C and D, by which the electrodes project initially beyond the lower edges of the associated clamping plates, will determine the force developed in each of the springs and the force between the electrodes and the workpieces while welding. It is not necessary that dimensions C and D are the same nor that the clamping forces developed on the workpiece are equal to the electrode forces. The welding force and the electrodes can be selected entirely independently from the clamping force or the spring back force of the workpiece. Also, the welding forces on the lower and upper electrodes may have different values. This allows the surface appearance of the weld to be different on opposite surfaces of the workpiece by locating the indentation at the weld entirely on one side of the workpiece.

The force developed in the springs can be determined and displayed through operation of piezo-electric devices 98, 100 located on a recess on the electrode arm and against which the corresponding springs bear by connecting suitable electronic instruments to the lead wires of the sensing device. A change in force will indicate that there is dilation or indentation in the weld area with respect to the adjacent surface under the clamping bars. No external reference point is needed, as needed in the devices described by Stiebel in U.S. Pat. No. 4,419,558 and SAE Technical Paper #860579. If it is desired to operate the welding gun with a variable force on the electrodes at the workpieces while making the weld, springs 80 and 88 can be replaced by hydraulic force cylinders which develop a force applied to the electrode arms. These forces can be readily varied in accordance with the magnitude of hydraulic pressure applied to the cylinder and these forces can be measured by suitably calibrating the electrical output produced by the piezo-electric sensors. When hydraulic cylinders with constant pressure settings are used for this purpose, they supply a constant force not a force that increases when the workpiece expands due to the welding heat, as is the case when compression springs are used. Selecting different initial forces applied by the electrodes to the weld will change the appearance of the welds, as is well known. The appearance of welds made with the device of this invention is better controlled by the operator because spring-back forces developed by the workpiece no longer affect the electrode force.

Having described a preferred embodiment of my invention, what I claim and desire to secure by U.S. Letters Patent is:

1. A device for holding and welding workpieces comprising:
   means for forcing the workpieces into contact and holding the workpieces in position while welding;
   electrode means for conducting welding current to the workpieces; and
   biasing means for urging the electrode means and the workpieces into contact independently of the effect of the forcing means.

2. The device of claim 1 wherein the forcing means comprises:
   a hydraulic cylinder having a piston movable therein in response to the application of hydraulic pressure to the cylinder; and
   a clamping ring connected to the piston, surrounding the electrode means, and adapted to move into contact with a workpiece in accordance with the movement of the piston.

3. The device of claim 1 wherein the electrode means comprises:
   an electrode surface moveable with respect to the clamping ring toward a workpiece due to the action of the biasing means and resting on a workpiece against the action of the biasing means;
   means connectable to an electric power source for conducting welding current to the electrode surface; and
   means for guiding movement of the electrode surface with respect to the forcing means.

4. A device for holding and welding workpieces comprising;
   means adapted to hold workpieces to be welded and adapted for connection to an actuating means for forcing the workpieces into mutual contact and holding them while welding;
   electrode means adapted to contact the workpieces at multiple locations for electrically connecting a source of welding current and the workpieces; and
   biasing means for urging the electrode means against the workpieces independently of the holding action of the forcing means.

5. The device of claim 4 wherein the electrode means includes electrode surfaces that are urged by the biasing means beyond the contacting means and closer to the workpieces than the contacting means while the contacting means are out of contact with the workpieces, and further comprising stop means for limiting movement of the electrode means relative to the contacting means.

6. The device of claim 5 further comprising means for adjusting the distance that the electrode surfaces extend beyond the contacting means while the stop means operates to limit movement of the electrode means relative to the contacting means.

7. The device of claim 4 further comprising means for indicating the magnitude of force applied to the electrode means by the biasing means.

8. The device of claim 4 further including means for cooling the electrode means.

9. The device of claim 5 wherein the stop means includes multiple means for limiting movement of the electrode means relative to the contacting means independently of the effect of other such limiting means.

10. A device for holding and welding workpieces comprising:
    electrode arms pivotably mounted for movement relative to the workpieces, supporting electrode surfaces adapted to contact the workpieces, and adapted to carry electric welding current to the workpieces;
    clamping arms pivotably mounted for movement toward and into contact with the upper and lower surfaces of the workpieces;
    biasing means for urging the electrode surfaces toward the workpieces;
    stop means for limiting movement of the electrode surfaces due to the influence of the biasing means relative to the clamping arms; and
    actuating means for forcing the clamping arms against the workpieces.

11. The device of claim 10 wherein the electrode means includes electrode surfaces that are urged by the biasing means beyond the contacting means and closer to the workpieces than the contacting means while the contacting means are out of contact with the workpieces, and further comprising stop means for limiting movement of the electrode means relative to the contacting means.

12. The device of claim 11 further comprising means for adjusting the distance that the electrode surfaces extend beyond the contacting means while the stop means operates to limit movement of the electrode means relative to the contacting means.

13. The device of claim 10 further comprising means for indicating the magnitude of force applied to the electrode means by the biasing means.

14. The device of claim 10 further including means for cooling the electrode means.

15. The device of claim 11 wherein the stop means includes multiple means for limiting movement of the electrode means relative to the contacting means independently of the affect of other such limiting means.

16. The device of claim 2 wherein the clamping ring clamps the workpieces together with a force greater than the force applied by the electrode means.

* * * * *